US012291894B2

(12) United States Patent
Ufkes et al.

(10) Patent No.: US 12,291,894 B2
(45) **Date of Patent: *May 6, 2025**

(54) WIRELESS CONTROLLED BLOCKING APPARATUS AND SINGLE POINT LOCKING SYSTEM

(71) Applicant: Security Enhancement Systems, LLC, Northbrook, IL (US)

(72) Inventors: Philip J. Ufkes, Sullivan's Island, SC (US); Steven J. Malone, Mount Pleasant, SC (US)

(73) Assignee: Security Enhancement Systems, LLC, Northbrook, IL (US)

( * ) Notice: Subject to any disclaimer, the term of this patent is extended or adjusted under 35 U.S.C. 154(b) by 199 days.

This patent is subject to a terminal disclaimer.

(21) Appl. No.: 18/126,408

(22) Filed: Mar. 25, 2023

(65) Prior Publication Data

US 2023/0295959 A1 Sep. 21, 2023

Related U.S. Application Data

(63) Continuation of application No. 17/027,122, filed on Sep. 21, 2020, now Pat. No. 11,613,912.

(Continued)

(51) Int. Cl.
*E05B 47/00* (2006.01)
*E05B 13/00* (2006.01)

(Continued)

(52) U.S. Cl.
CPC ........ *E05B 47/0012* (2013.01); *E05B 13/001* (2013.01); *E05B 63/143* (2013.01); *E05B 65/006* (2013.01)

(58) Field of Classification Search
CPC ............. E05B 47/0012; E05B 47/0046; E05B 47/0047; E05B 47/0607; E05B 47/0657;

(Continued)

(56) References Cited

U.S. PATENT DOCUMENTS 5,077,940 A * 1/1992 LaRose, Jr. ........... E05C 19/003 292/259 R
11,613,912 B2 * 3/2023 Ufkes ................... E05B 63/143 70/278.1

(Continued)

FOREIGN PATENT DOCUMENTS

AT 7419 U1 * 3/2005 ............. E05B 47/06
AU 2009248467 A1 11/2010

(Continued)

OTHER PUBLICATIONS

Extended European Search Report, European application No. 20866824.4. Date of mailing: Aug. 28, 2023. European Patent Office, Munich, DE.

*Primary Examiner* — Gilbert Y Lee
*Assistant Examiner* — Peter H Watson
(74) *Attorney, Agent, or Firm* — Gregory Finch; Finch Paolino, LLC

(57) ABSTRACT

A wirelessly controlled blocking apparatus to enable a single-point locking system for securing multiple access points on a cabinet panel. Certain aspects of the present disclosure provide for a wirelessly controlled blocking apparatus to enable a single-point locking system for securing multiple access points. In accordance with certain embodiments, the wirelessly controlled blocking apparatus is utilized to secure an access panel of an enclosure, such as an electronics cabinet. In accordance with certain preferred embodiments, an electronics cabinet comprises a plurality of quarter-turn cam latches being installed on the access panel and configured to selectively secure the access panel to an opening of the enclosure.

20 Claims, 13 Drawing Sheets

Related U.S. Application Data

(60) Provisional application No. 62/903,686, filed on Sep. 20, 2019.

(51) Int. Cl.
*E05B 63/14* (2006.01)
*E05B 65/00* (2006.01)

(58) Field of Classification Search
CPC ..... E05B 2047/0015; E05B 2047/0017; E05B 2047/0024; E05B 2047/0036; E05B 63/12; E05B 63/128; E05B 63/14; E05B 63/143; E05B 63/146; E05B 63/18; E05B 65/006; E05B 65/02; E05B 65/025; E05B 13/001; E05B 2015/105; E05B 13/007; E05B 47/00; E05B 47/06; E05B 47/0001; E05B 47/0002; E05B 47/0005; E05B 2047/0014; E05B 17/208; E05B 17/2034; E05B 17/2053; E05B 13/002; E05B 15/0053; E05B 15/0073; E05B 15/021; E05B 63/244; E05B 35/008; Y10T 292/0801; Y10T 292/0848; Y10T 292/0849; Y10T 292/0857; Y10T 292/696; Y10T 292/699; Y10T 292/702; Y10T 292/03; E05C 19/003; E05C 3/042
USPC ........ 312/216; 292/194, 195, 198, 201, 202, 292/210, 240, 341.15, 341.17; 361/139, 361/143
See application file for complete search history.

(56) References Cited

U.S. PATENT DOCUMENTS

| | | | | |
|---|---|---|---|---|
| 2019/0153756 | A1* | 5/2019 | Huang | E05B 47/0038 |
| 2020/0256096 | A1 | 8/2020 | Olkay et al. | |

FOREIGN PATENT DOCUMENTS

| | | | |
|---|---|---|---|
| WO | 2007140548 | A1 | 12/2007 |
| WO | 2009109972 | A1 | 9/2009 |
| WO | 2018054528 | A2 | 3/2018 |

* cited by examiner

WIRELESS CONTROLLED BLOCKING APPARATUS AND SINGLE POINT LOCKING SYSTEM

CROSS-REFERENCE TO RELATED APPLICATIONS

This application is a continuation of U.S. application Ser. No. 17/027,122 filed on Sep. 21, 2020, which claims the benefit of U.S. Provisional Application Ser. No. 62/903,686, filed on Sep. 20, 2019 entitled "WIRELESS CONTROLLED BLOCKING APPARATUS AND SINGLE POINT LOCKING SYSTEM," the disclosures of which are hereby incorporated in their entirety at least by reference.

FIELD

The present disclosure relates to the field of electronic access controls; in particular, a wirelessly controlled blocking apparatus to enable a single-point locking system for securing multiple access points on a cabinet panel.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

An object of the present disclosure is to provide for a single-point locking system to secure multiple access points.

Specific embodiments of the present disclosure provide for a wirelessly controlled locking apparatus and system to secure the back panels of a data cabinet comprising a series of ¼ turn cam latches.

An object of the present disclosure is to provide for an electronic locking system that eliminates the need to install multiple padlocks or other devices to secure a rear access panel or door panel of an enclosure, such as a data cabinet or an electronics cabinet.

Specific embodiments of the present disclosure provide for a wirelessly controlled blocking apparatus being operably engaged via a secured wireless communication interface. Specific embodiments of the present disclosure provide for a wirelessly controlled blocking apparatus comprising one or more blocker bars being configured to enable the user to open/lock one or more access panels without the need for a physical key or multiple padlocks.

Certain aspects of the present disclosure provide for a keyless locking system comprising a first cam assembly comprising a cam latch configured to be securely interfaced with a quarter-turn bracket and an adapter portion configured to interface with a second cam assembly, wherein the second cam assembly comprises a quarter-turn cam latch configured to selectively secure an access panel or door panel of an enclosure; a strike plate assembly coupled to the quarter-turn cam latch of the second cam assembly, the strike plate assembly comprising a strike plate and a strike pin coupled to the strike plate; a locking assembly configured to be coupled to an inside surface of the access panel or door panel of the enclosure, the locking assembly comprising a locking mechanism configured to selectively secure the strike pin when configured in a locked position and release the strike pin when configured in an unlocked position; and an electronic actuator comprising at least one wireless receiver, a driver mechanism and a power supply, wherein the electronic actuator is configured to engage the driver mechanism upon wirelessly receiving an access code signal from an electronic device, wherein the driver mechanism, when engaged, is configured to disengage the locking assembly from a locked position to an unlocked position.

In accordance with certain embodiments of the keyless locking system, the locking assembly may comprise a pawl member and a trigger member, the trigger member comprising a tooth portion configured to selectively restrict rotation of the pawl member. In certain embodiments, the driver mechanism may be configured to rotate the trigger member to release the pawl member. In certain embodiments, the strike pin may be configured to rotate the pawl member to configure the locking assembly from an unlocked position to a locked position. In certain embodiments, the strike plate may be configured to restrict rotation of the quarter-turn cam latch when the strike pin is selectively secured by the locking mechanism when configured in the locked position.

Further aspects of the present disclosure provide for a keyless locking system comprising at least one cover plate configured to be selectively secured to an outside surface of an access panel of an enclosure, the at least one cover plate configured to conceal a housing of a panel cam lock on the outside surface of the access panel of the enclosure; a first cam assembly comprising a first cam latch configured to be selectively interfaced with a bracket coupled to the outside surface of the access panel of the enclosure and configured to secure the at least one cover plate to the access panel of the enclosure when the first cam latch is engaged in a locked position; a cam adapter coupled to or disposed on the first cam latch and configured to interface with a second cam assembly, wherein the second cam assembly comprises a second cam latch configured to selectively secure the access panel to the enclosure when the second cam latch is engaged in a locked position; a strike plate assembly coupled to the second cam latch of the second cam assembly, the strike plate assembly comprising a strike plate and a strike pin coupled to the strike plate; a locking assembly configured to be coupled to an inside surface of the access panel of the enclosure, the locking assembly comprising a locking mechanism configured to selectively secure the strike pin when configured in a locked position and release the strike pin when configured in an unlocked position; and an electronic actuator comprising at least one wireless receiver, a driver mechanism and a power supply, wherein the electronic actuator is configured to actuate the driver mechanism upon wirelessly receiving an access code signal from an electronic device, wherein the driver mechanism, when actuated, is configured to disengage the locking assembly from a locked position to an unlocked position.

In accordance with certain aspects of the present disclosure, a keyless locking system may further comprise at least one locking bar configured to be selectively interfaced with the bracket and configured to secure the at least one cover plate to the access panel of the enclosure when the first cam latch is engaged in the locked position. In accordance with certain embodiments, the at least one cover plate may be configured to be selectively removed from the outside surface of the access panel of the enclosure when the first cam latch is engaged in the unlocked position. In certain embodiments, the locking assembly may comprise a pawl member and a trigger member, the trigger member comprising a tooth portion configured to selectively restrict rotation of the pawl member. In certain embodiments, the driver mechanism is configured to rotate the trigger member to release the pawl member. In certain embodiments, the strike pin may be configured to rotate the pawl member to configure the locking assembly from the unlocked position to the locked position. In certain embodiments, the strike plate may be configured to restrict rotation of the second cam latch when the strike pin is selectively secured by the locking mechanism when configured in the locked position. In certain embodiments, the cam adapter may be configured to rotate the second cam latch simultaneously with the first cam latch.

Still further aspects of the present disclosure provide for a keyless locking apparatus comprising a first cam assembly comprising a first cam latch configured to be selectively interfaced with a bracket coupled to an outside surface of an access panel of an enclosure when the first cam latch is engaged in a locked position; a second cam assembly comprising a second cam latch configured to selectively secure the access panel of the enclosure when the second cam latch is engaged in a locked position; a cam adapter coupled to or disposed on the first cam latch and operably interfaced with the second cam assembly, wherein the cam adapter is configured to rotate the second cam latch simultaneously with the first cam latch; a strike plate assembly coupled to the second cam latch of the second cam assembly, the strike plate assembly comprising a strike plate and a strike pin coupled to the strike plate; and an electronic locking assembly configured to be coupled to an inside surface of the access panel of the enclosure, the electronic locking assembly comprising a locking mechanism configured to selectively secure the strike pin when configured in a locked position and selectively release the strike pin when configured in an unlocked position, wherein the electronic locking assembly is configured to selectively release the strike pin upon wirelessly receiving an access code signal from an electronic device.

In accordance with certain embodiments, the electronic locking assembly may further comprise an electronic actuator configured to actuate a driver mechanism to selectively release the strike pin. The electronic locking assembly may further comprise a pawl member and a trigger member, the trigger member comprising a tooth portion configured to selectively restrict rotation of the pawl member. In certain embodiments, the electronic locking assembly may be configured to rotate the trigger member to selectively release the strike pin upon wirelessly receiving the access code signal from the electronic device.

Still further aspects of the present disclosure provide for a method for securing an access panel of an enclosure comprising installing a keyless locking apparatus on the access panel of the enclosure; configuring the first cam latch and the second cam latch in the locked position; selectively securing the strike pin with the electronic locking assembly; and selectively releasing the strike pin upon wirelessly receiving the access code signal from the electronic device communicably engaged with the electronic locking assembly. In certain embodiments, the method may further comprise securing at least one cover plate to the outside surface of the access panel of the enclosure. In certain embodiments, the at least one cover plate may be configured to conceal a cam lock housing on the outside surface of the access panel of the enclosure.

The foregoing has outlined rather broadly the more pertinent and important features of the present invention so that the detailed description of the invention that follows may be better understood and so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present invention. It should be realized by those skilled in the art that such equivalent structures do not depart from the spirit and scope of the invention as set forth in the appended claims.

BRIEF DESCRIPTION OF DRAWINGS

The above and other objects, features and advantages of the present disclosure will be more apparent from the following detailed description taken in conjunction with the accompanying drawings, in which.

DETAILED DESCRIPTION

Figure 1:
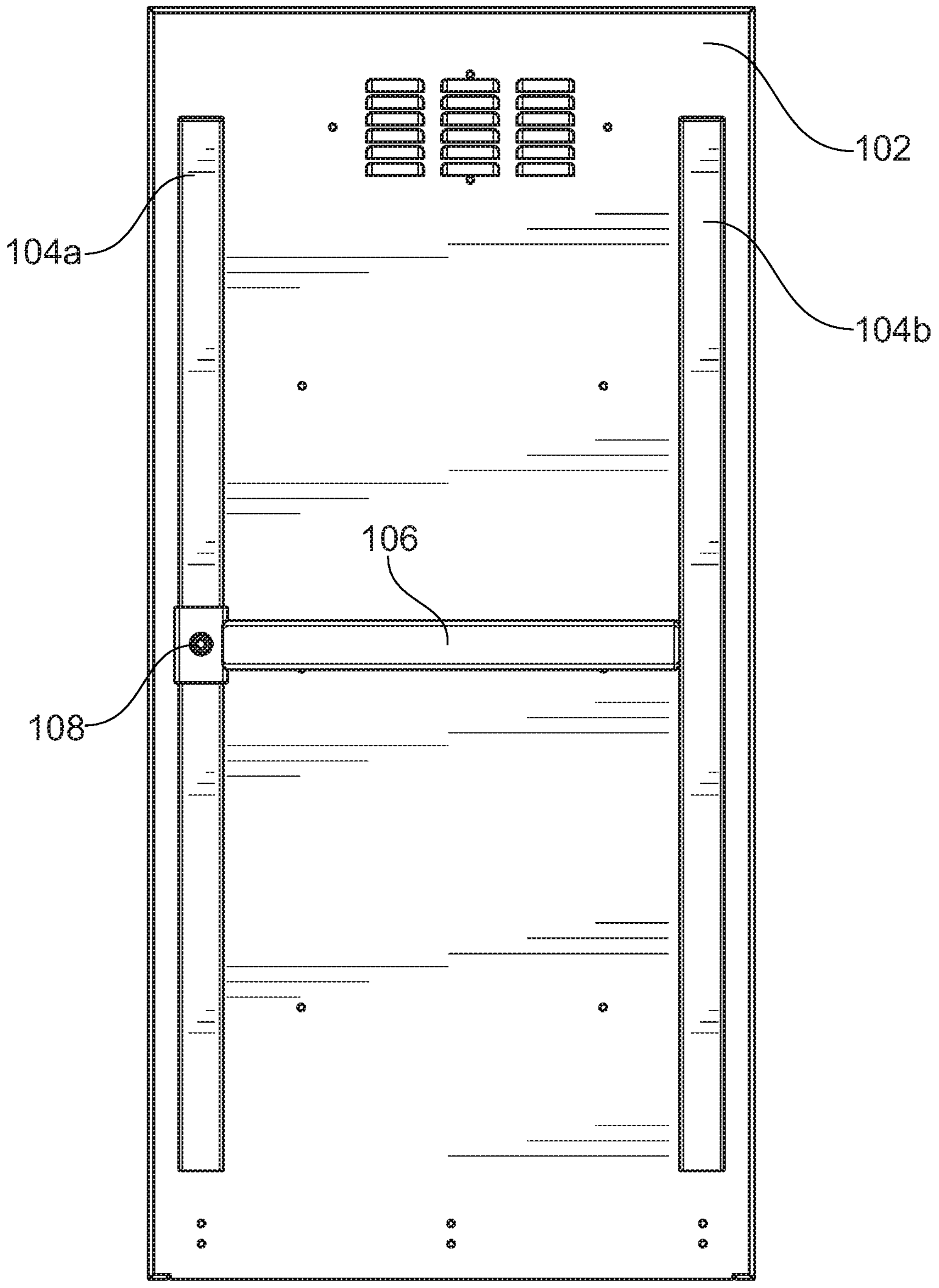
FIG. 1 is a front plan view of a keyless locking system installed on an access panel for an enclosure, according to certain aspects of the present disclosure.

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term “a” and/or “an” shall mean “one or more,” even though the phrase “one or more” is also used herein. Furthermore, when it is said herein that something is “based on” something else, it may be based on one or more other things as well. In other words, unless expressly indicated otherwise, as used herein “based on” means “based at least in part on” or “based at least partially on.” Like numbers refer to like elements throughout.

The terminology used herein is for describing particular embodiments only and is not intended to be limiting of the embodiments. As used herein, the singular forms “a,” “an,” and “the” are intended to include the plural forms as well, unless the context clearly indicates otherwise. It will be further understood that the terms “comprises,” “comprising,” “includes,” and/or “including,”, and variants thereof, when used herein, specify the presence of stated features, steps, operations, elements, and/or components, but do not preclude the presence or addition of one or more other features, steps, operations, elements, components, and/or groups thereof.

It will be understood that when an element is referred to as being “coupled,” “connected,” or “responsive” to another element, it can be directly coupled, connected, or responsive to the other element, or intervening elements may also be present. In contrast, when an element is referred to as being “directly coupled,” “directly connected,” or “directly responsive” to another element, there are no intervening elements present. As used herein, the term “and/or” includes any and all combinations of one or more of the associated listed items.

Spatially relative terms, such as “above,” “below,” “upper,” “lower,” “top, “bottom,” and the like, may be used herein for ease of description to describe one element or feature’s relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as “below” other elements or features would then be oriented “above” the other elements or features. Thus, the term “below” can encompass both an orientation of above and below. The device may be otherwise oriented (rotated 90 degrees or at other orientations) and the spatially relative descriptors used herein interpreted accordingly. Well-known functions or constructions may not be described in detail for brevity and/or clarity.

It will be understood that, although the terms “first,” “second,” etc. may be used herein to describe various elements, these elements should not be limited by these terms. These terms are only used to distinguish one element from another. Thus, a first element could be termed a second element without departing from the teachings of the present embodiments. Unless otherwise defined, all terms (including technical and scientific terms) used herein have the same meaning as commonly understood by one of ordinary skill in the art to which these embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes. The present disclosure should in no way be limited to the exemplary implementation and techniques illustrated in the drawings and described below.

Where a range of values is provided, it is understood that each intervening value, to the tenth of the unit of the lower limit unless the context clearly dictates otherwise, between the upper and lower limit of that range and any other stated or intervening value in that stated range is encompassed by the invention. The upper and lower limits of these smaller ranges may independently be included in the smaller ranges, and are also encompassed by the invention, subject to any specifically excluded limit in a stated range. Where a stated range includes one or both of the endpoint limits, ranges excluding either or both of those included endpoints are also included in the scope of the invention.

As used herein, “exemplary” means serving as an example or illustration and does not necessarily denote ideal or best.

As used herein, the term “includes” means includes but is not limited to; the term “including” means including but not limited to. The term “based on” means based at least in part on.

As used herein, the term “packet” refers to any formatted unit of data that may be sent and/or received by an electronic device.

As used herein, the term “payload” refers to any part of transmitted data that constitutes an intended message and/or identifying information.

As used herein, the term “interface” refers to any shared boundary across which two or more separate components of a computer system may exchange information. The exchange can be between software, computer hardware, peripheral devices, humans, and combinations thereof.

As used herein, the term “advertising” or “advertisement” refers to any transmitted packet configured to establish a data transfer interface between two electronic devices. An “advertising” or “advertisement” may include, but is not limited to, a BLE advertising packet transmitted by a peripheral device over at least one Bluetooth advertisement channel.

Certain aspects of the present disclosure provide for a wirelessly controlled blocking apparatus to enable a single-point locking system for securing multiple access points. In accordance with certain embodiments, the wirelessly controlled blocking apparatus is utilized to secure an access panel of an enclosure, such as an electronics cabinet. In accordance with certain preferred embodiments, an electronics cabinet comprises a plurality of quarter-turn cam latches being installed on the access panel and configured to selectively secure the access panel to an opening of the enclosure.

Figure 3:
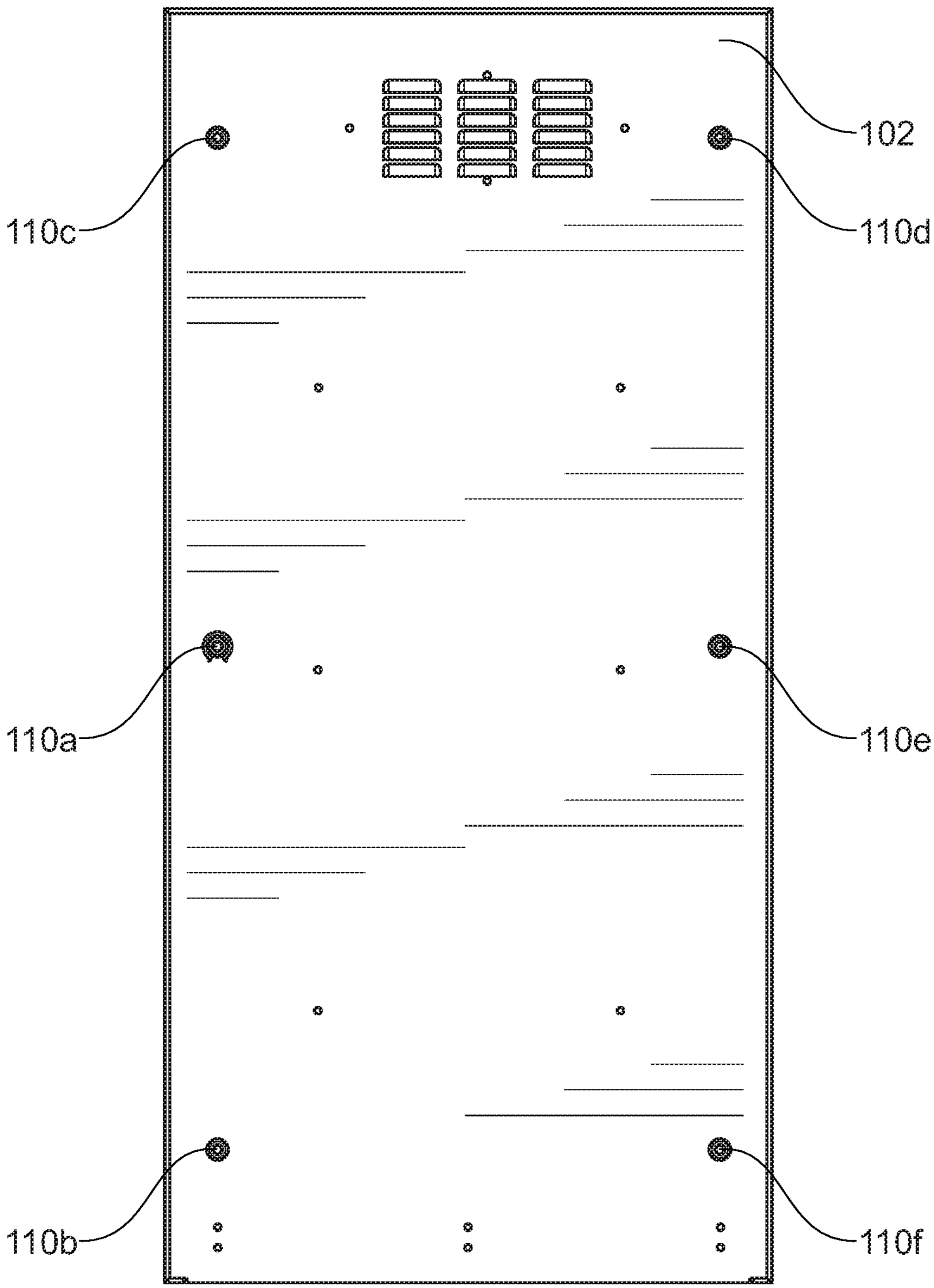
FIG. 3 is a front plan view of an access panel for an enclosure.

Turning now descriptively to the drawings, in which similar reference characters denote similar elements throughout the several views, FIG. 1 depicts a keyless locking system installed on an access panel of an enclosure. According to certain aspects of the present disclosure, a panel 102 may comprise an access panel or a door for an enclosure, such as a data cabinet, an electrical cabinet and the like. In accordance with certain embodiments, an access panel or door may comprise one or more quarter-turn panel cam configured to selectively secure the access panel or door to a perimeter or opening of the enclosure. A keyless locking system in accordance with certain aspects of the present disclosure may comprise one or more cover bar; for example, cover bar 104*a* and cover bar 104*b*. Cover bar 104*a* and cover bar 104*b* may be coupled to an outside surface of panel 102 to conceal one or more quarter-turn panel cams; for example, quarter-turn panel cams 110*a-f* (as shown in FIG. 3). A center bar 106 may extend between cover bar 104*a* and cover bar 104*b* and may be coupled to cover bar 104*a* at a first end and coupled to cover bar 104*b* at a second end. An external cam 108 may be coupled to center bar 106 at the first end of center bar 106 and may be configured to selectively couple center bar 106 to cover bar 104*a*.

Figure 2:
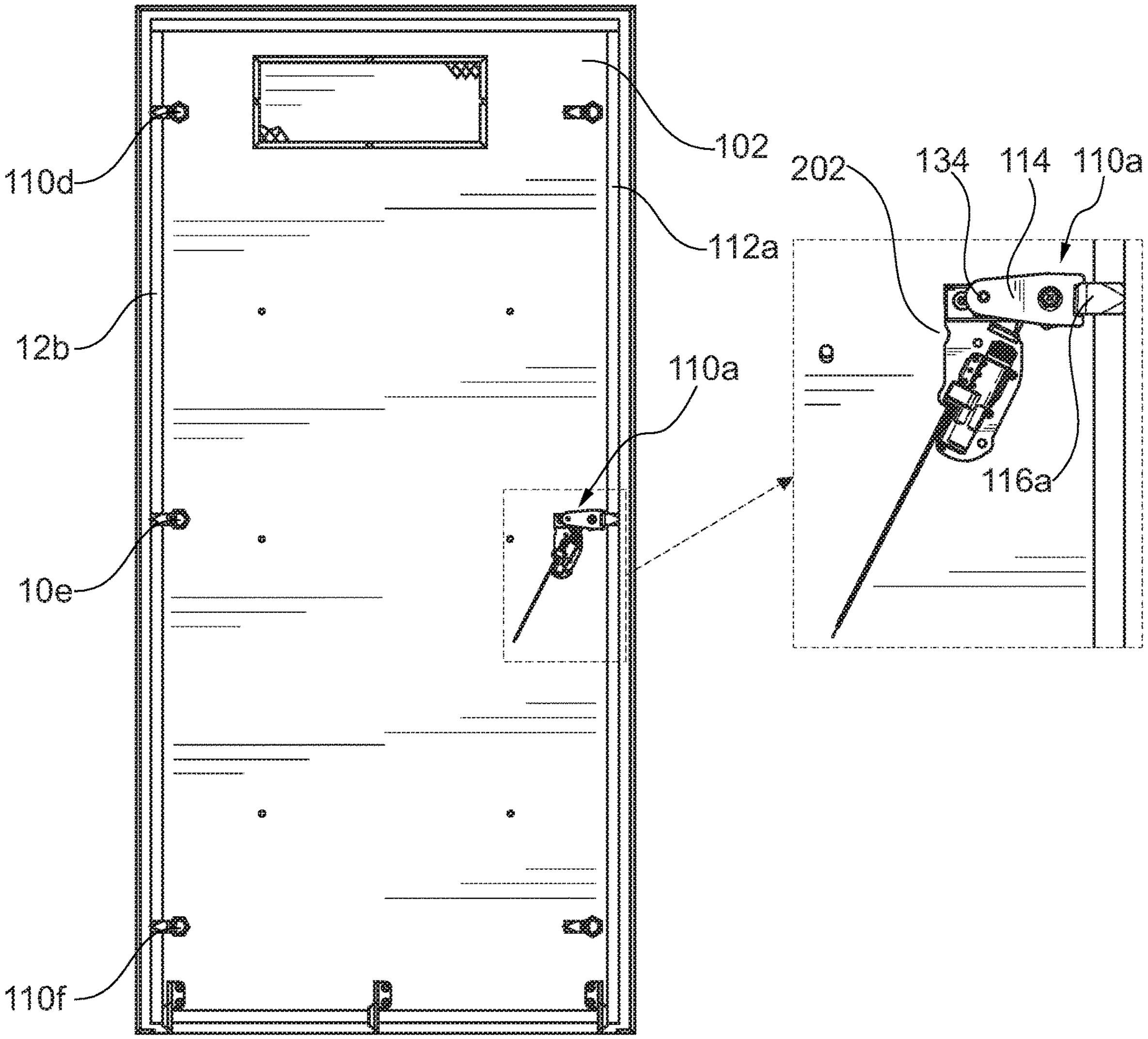
FIG. 2 is a rear plan view of a keyless locking system installed on an access panel for an enclosure, according to certain aspects of the present disclosure.

Referring now to FIGS. 2 and 3, plan views of the keyless locking system installed on panel 102 are shown, according to certain aspects of the present disclosure. In certain embodiments, panel 102 may comprise a plurality of quarter-turn panel cams coupled to panel 102 and extending from an outside surface of panel 102 (as shown in FIG. 3) to an inside surface of panel 102; for example, quarter-turn panel cams 110*a-f* Panel cams 110*a-f* may be configured to selectively couple panel 102 to vertical bars 112*a* and 112*b* of the enclosure (not pictured). The keyless locking system may comprise a strike plate 114 coupled to a cam latch 116*a* of quarter-turn panel cam 110*a*. A locking assembly 202 may be coupled to an inside surface of panel 102 and may be selectively interfaced with a strike plate pin 134 and configured to block strike plate pin 134 and restrict quarter-turn panel cam 110*a* from turning when strike plate pin 134 is interfaced with locking assembly 202 in a locked configuration.

Figure 4A:
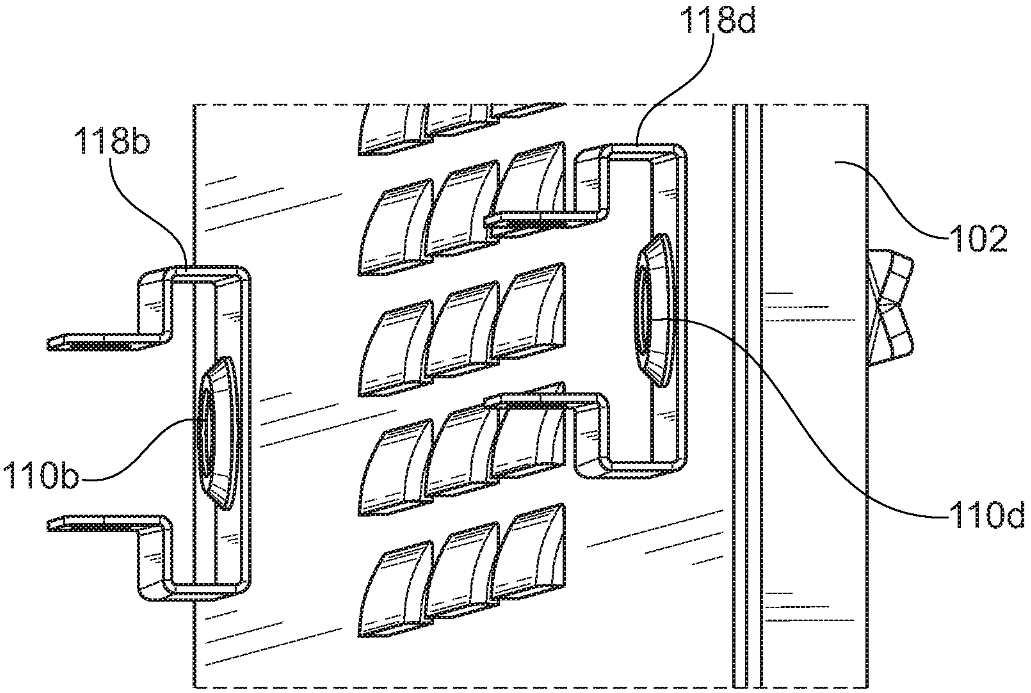
FIG. 4A is a perspective view of a quarter-turn bracket coupled to a cam housing installed on an access panel for an enclosure.
Figure 4B:
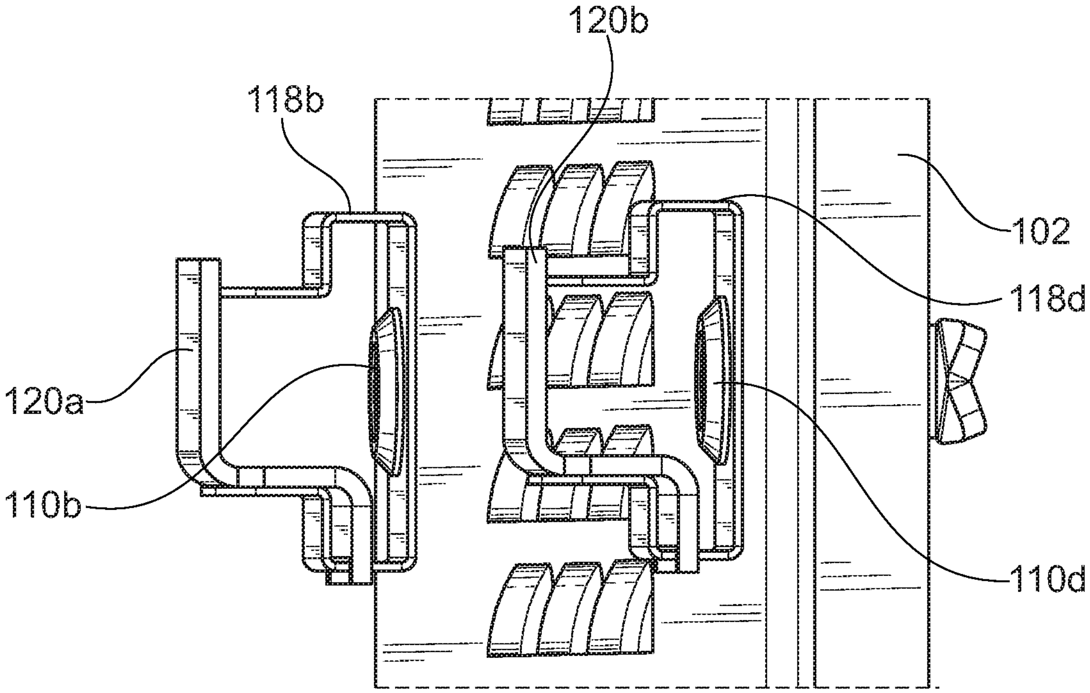
FIG. 4B is a perspective view of a bracket connecter for a cover bar coupled to the quarter-turn bracket, according to certain aspects of the present disclosure.
Figure 5:
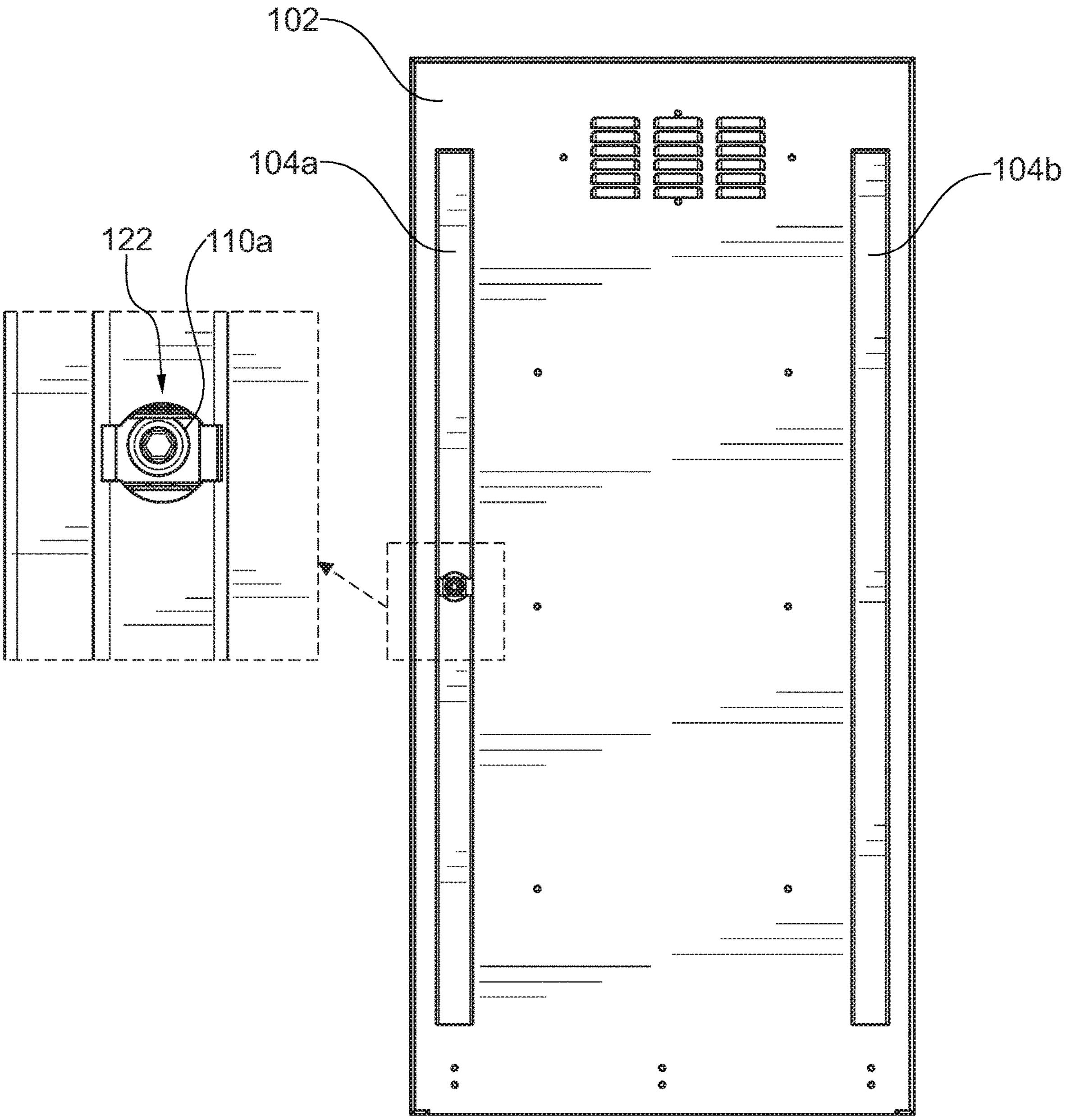
FIG. 5 is a plan view of vertical cover bars coupled to an outside surface of an access panel for an enclosure, according to certain aspects of the present disclosure.
Figure 6:
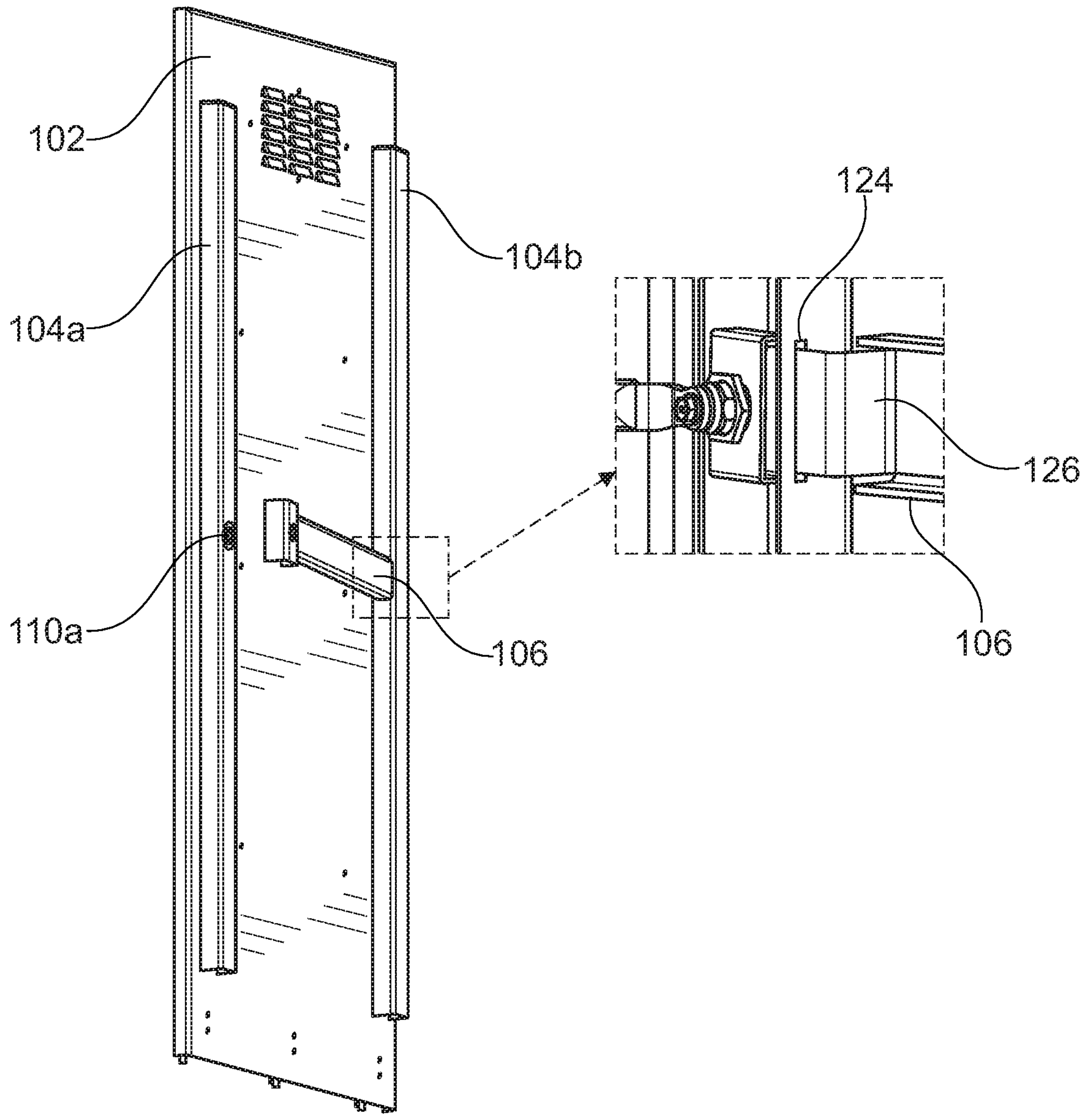
FIG. 6 is a perspective view of a center bar coupled to a vertical cover bar and in an unlocked configuration, according to certain aspects of the present disclosure.
Figure 7A:
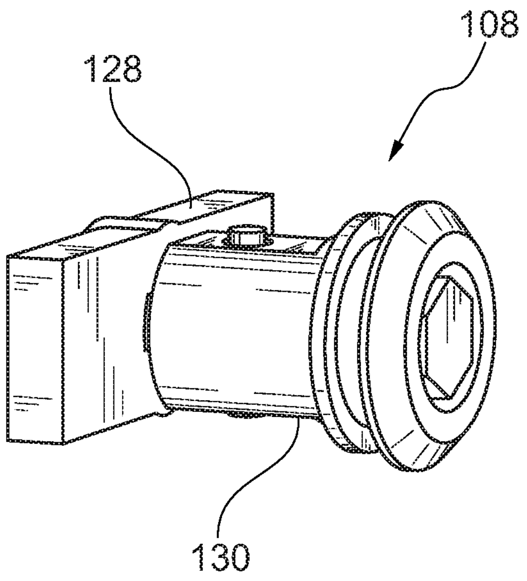
FIG. 7A is a perspective view of an external cam assembly, according to certain aspects of the present disclosure.
Figure 7B:
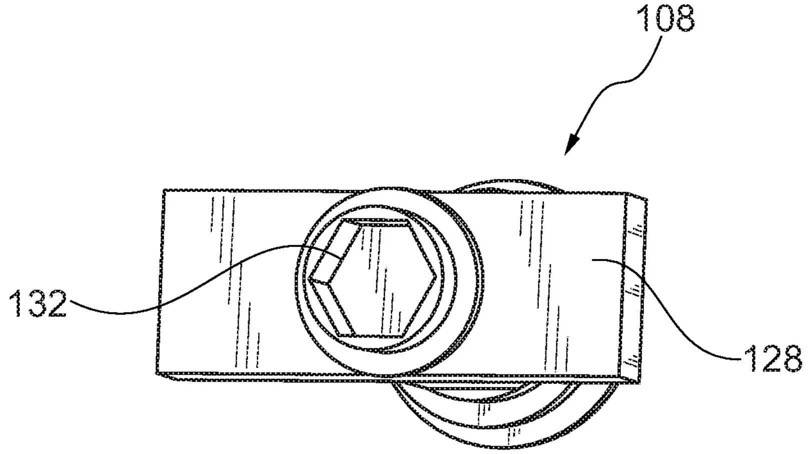
FIG. 7B is a perspective view of an external cam assembly, according to certain aspects of the present disclosure.

Referring now to FIGS. 4A-4B, perspective views of components of the keyless locking system installed on panel 102 are shown, according to certain aspects of the present disclosure. In certain embodiments, one or more quarter-turn brackets 118 may be coupled to an outside surface of panel 102; for example, quarter-turn bracket 118*b* and quarter-turn bracket 118*d*. In certain embodiments, quarter-turn bracket 118*b* and quarter-turn bracket 118*d* may be coupled to quarter-turn cam 110*b* and quarter-turn cam 110*d*, respectively. In certain embodiments, the keyless locking system may further comprise a cover bar tab 120*a* mateably interfaced with quarter-turn bracket 118*b* and a cover bar tab 120*b* mateably interfaced with quarter-turn bracket 118*d*. In certain embodiments, cover bar tab 120*a* and cover bar tab 120*b* may be configured to secure cover bar 104*a* and cover bar 104*b* to quarter-turn bracket 118*b* and quarter-turn bracket 118*d*, respectively. In accordance with certain embodiments, as shown in FIG. 5, cover bar 104*a* may comprise a cam access aperture 122 defining an opening in cover bar 104*a*. Cam access aperture 122 may be configured to enable external cam 108 (as shown in FIGS. 7A-7B) to pass therethrough. In accordance with certain embodiments, as shown in FIG. 6, center bar 106 may be coupled to cover bar 104*b* by interfacing a center bar connector 126 extending from an end of center bar 106 with a center bar slot 124 disposed on a surface of cover bar 104*b*. In accordance with certain embodiments, upon interfacing center bar connector 126 of center bar 106 with center bar slot 124 of cover bar 104*b*, center bar 106 may be rotated laterally to interface with cover bar 104*a* at an opposite end of center bar 106.

Figure 8A:
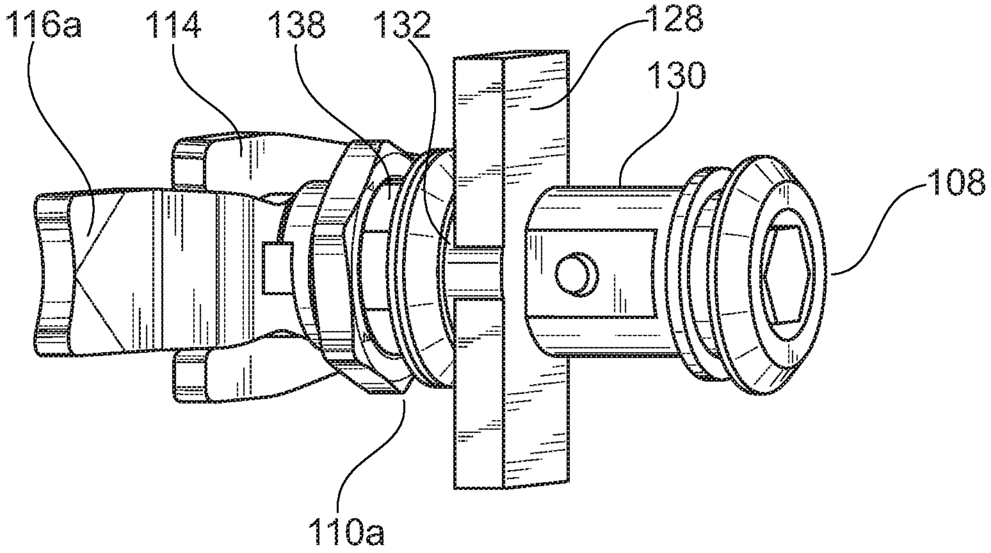
FIG. 8A is a perspective view of an external cam assembly interfaced with a panel cam assembly interfaced with a strike plate assembly, according to certain aspects of the present disclosure.
Figure 8B:
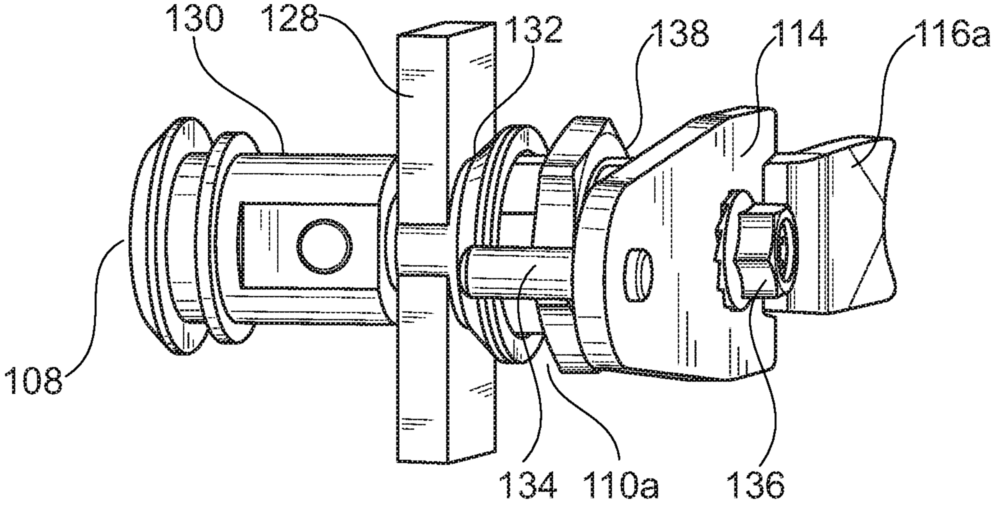
FIG. 8B is a perspective view of an external cam assembly interfaced with a panel cam assembly interfaced with a strike plate assembly, according to certain aspects of the present disclosure.
Figure 9:
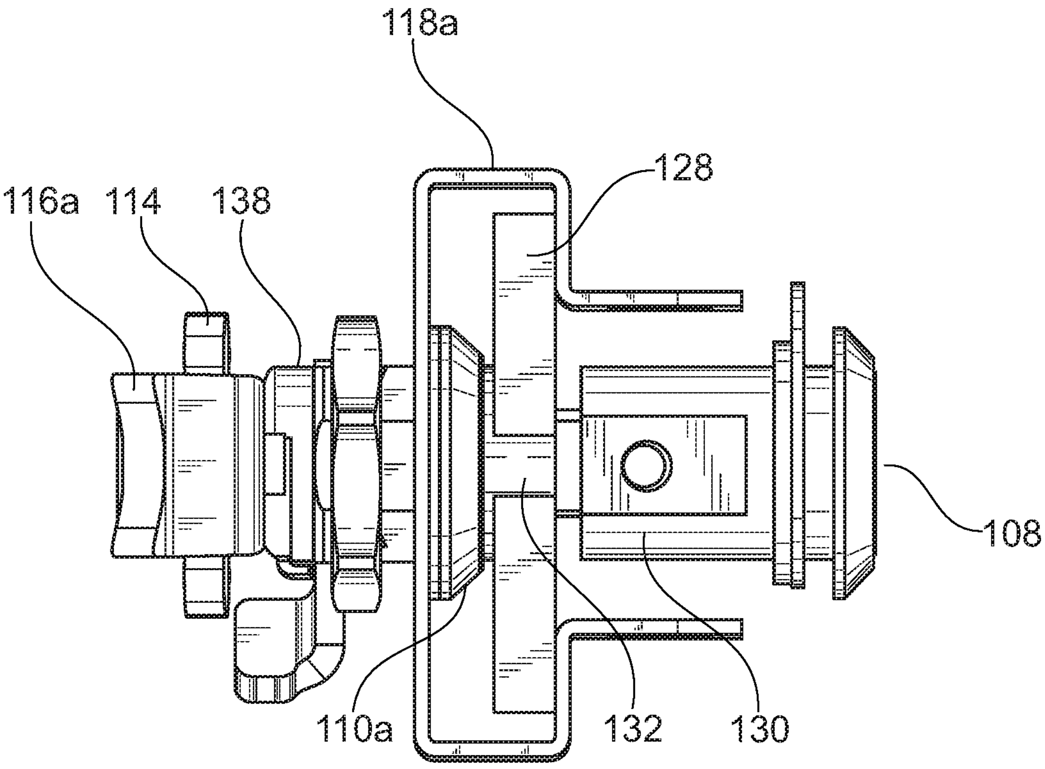
FIG. 9 is a perspective view illustrating an external cam latch in a locked position with a quarter-turn bracket, according to certain aspects of the present disclosure.

Referring now to FIGS. 7A-7B, perspective views of external cam 108 are shown. According to certain aspects of the present disclosure, external cam 108 may comprise an external cam body 130, an external cam latch 128 and a cam adapter 132. As shown in FIGS. 8A-8B, cam adapter 132 may be configured to interface with panel cam housing 138 of panel cam 110*a*. According to certain embodiments, cam adapter 132 may be configured to rotate panel cam 110*a* together with external cam 108 such that panel cam latch 116*a* and external cam latch 128 may be simultaneously rotated upon a user rotating external cam 108. In accordance with certain embodiments, strike plate 114 may be operably interfaced with panel cam latch 116*a* and coupled to external cam body 130 via a screw 136 such that strike plate 114 and panel cam latch 116*a* may be simultaneously rotated upon a user rotating external cam 108. Strike plate pin 134 may be coupled to strike plate 114 and extend laterally from strike plate 114. As shown in FIG. 9, external latch 128 may be securely interfaced with quarter-turn bracket 118*a* in a locked configuration when cam adapter 132 is interfaced with panel cam 110*a*.

Figure 10:
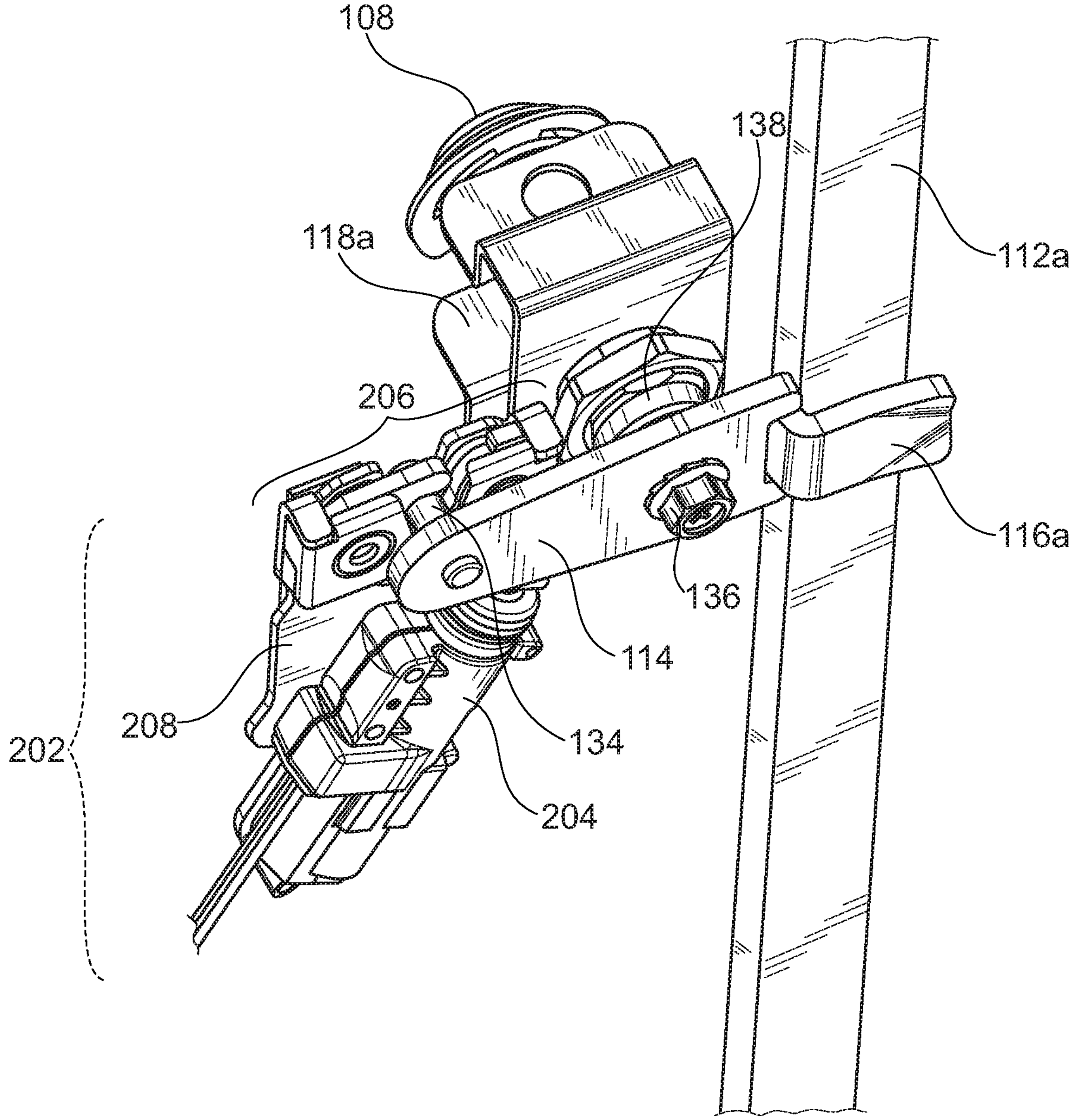
FIG. 10 is a functional perspective view of a keyless locking system in a locked configuration, according to certain aspects of the present disclosure.
Figure 11:
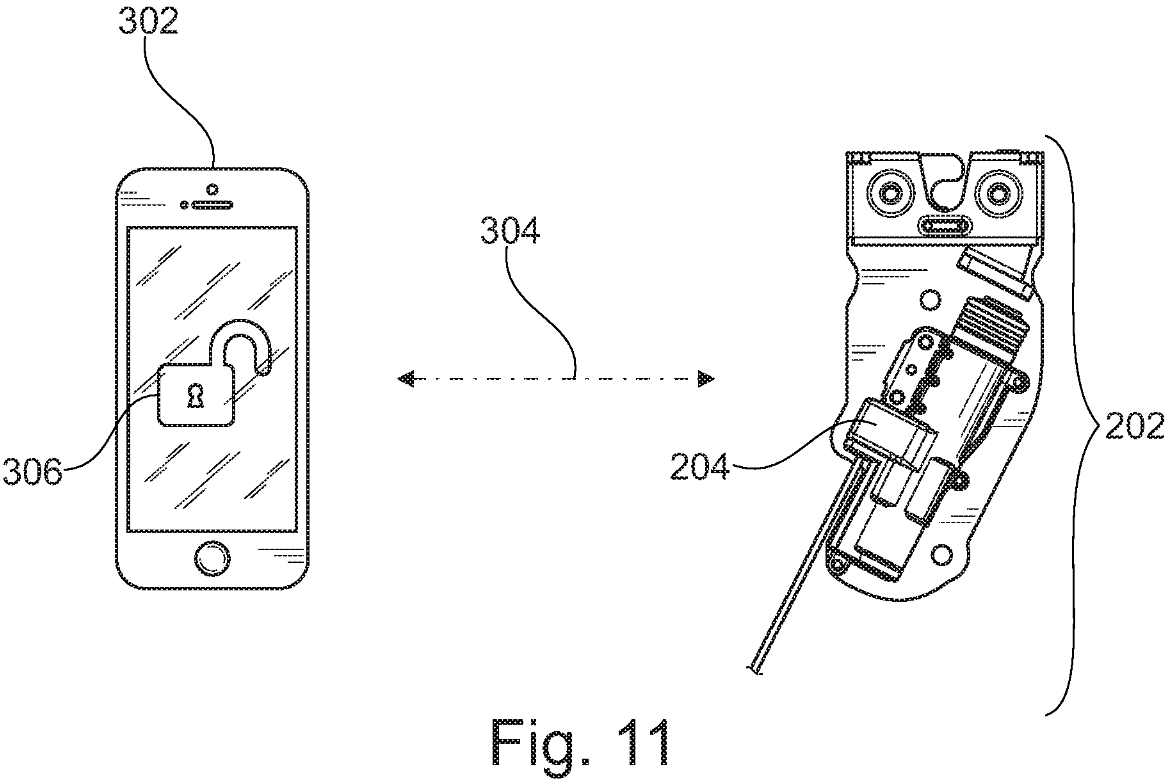
FIG. 11 is a functional schematic view of a mobile electronic device communicably engaged with an electronic locking assembly, according to certain aspects of the present disclosure.

Referring now to FIG. 10, a functional perspective view of a keyless locking system of the present disclosure is shown in a locked configuration. According to certain aspects of the present disclosure, external cam 108 is configured in a closed rotation such that panel cam latch 116*a* is interfaced with enclosure bar 112*a*. In accordance with an embodiment, locking assembly 202 comprises mounting plate 208, electronic actuator 204, and blocker assembly 206. Blocker assembly 206 may be configured to receive strike plate pin 134 in an unlocked/open configuration and retain/block strike plate pin 134 from lateral movement in a locked/closed configuration (as shown in FIG. 10). In accordance with certain aspects of the present disclosure, blocker assembly 206 may be configured from an unlocked/open configuration to the locked/closed configuration in response to receiving strike plate pin 134. In accordance with certain embodiments, strike plate pin 134 may be configured to rotate a blocker arm of blocker assembly 206 downward from an open position to a closed position. Once in the closed position, the blocker arm may be interfaced with a locking mechanism to prevent the blocker arm from rotation, thereby blocking strike plate pin 134 from lateral movement and retaining strike plate pin 134 in blocker assembly 206. In accordance with certain aspects of the present disclosure, and as shown in FIG. 11, a mobile electronic device 302 may be communicably engaged with electronic actuator 204 of locking assembly 202 via a wireless communications interface 306 (e.g. Bluetooth, BLE, NFC, LoRA etc.). Mobile electronic device 302 may be configured to communicate a wireless signal comprising a data packet containing an access code 306 to a receiver of electronic actuator 204 via wireless communications interface 306. Electronic actuator 204 may comprise an integrated circuit or other processing and data storage circuitry configured to receive and authenticate the access code. Upon receiving and authenticating the access code, electronic actuator 204 may be configured to engage a driver mechanism to configure blocker assembly 206 from a locked configuration to an unlocked configuration (as further shown and described in FIGS. 12-14, below).

Figure 12:
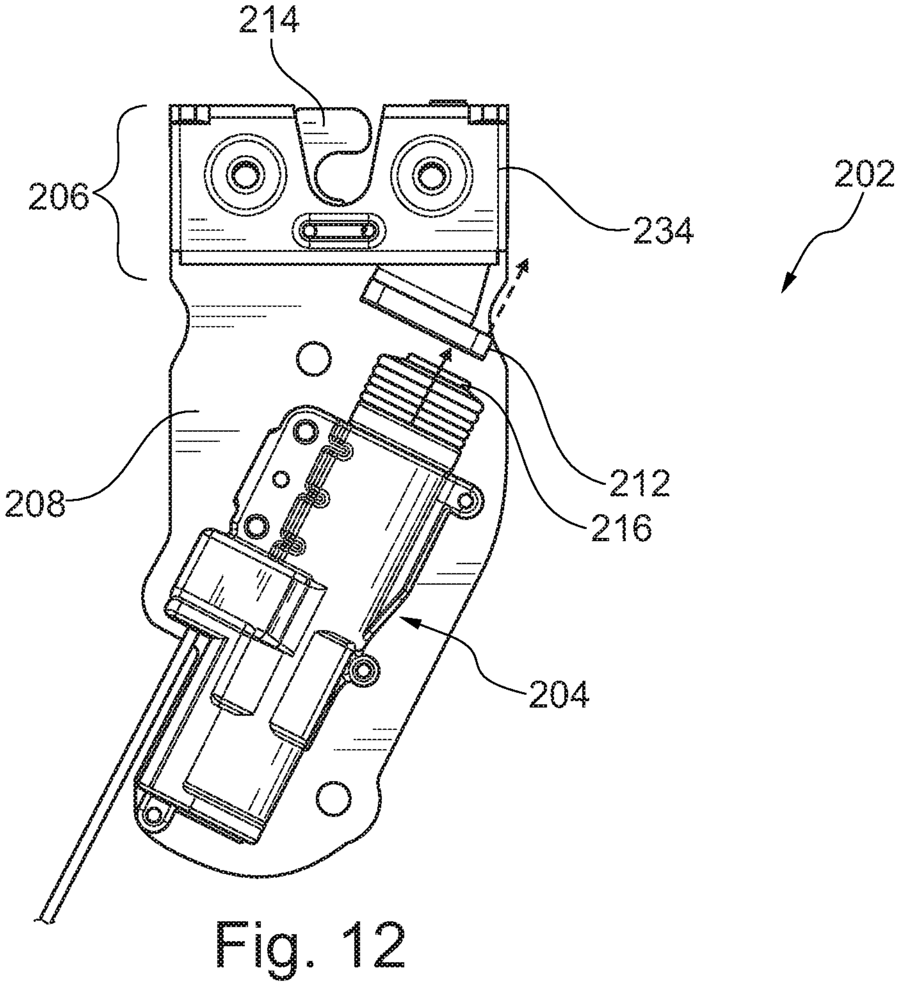
FIG. 12 is a plan view of an electronic locking assembly, according to certain aspects of the present disclosure.
Figure 13:
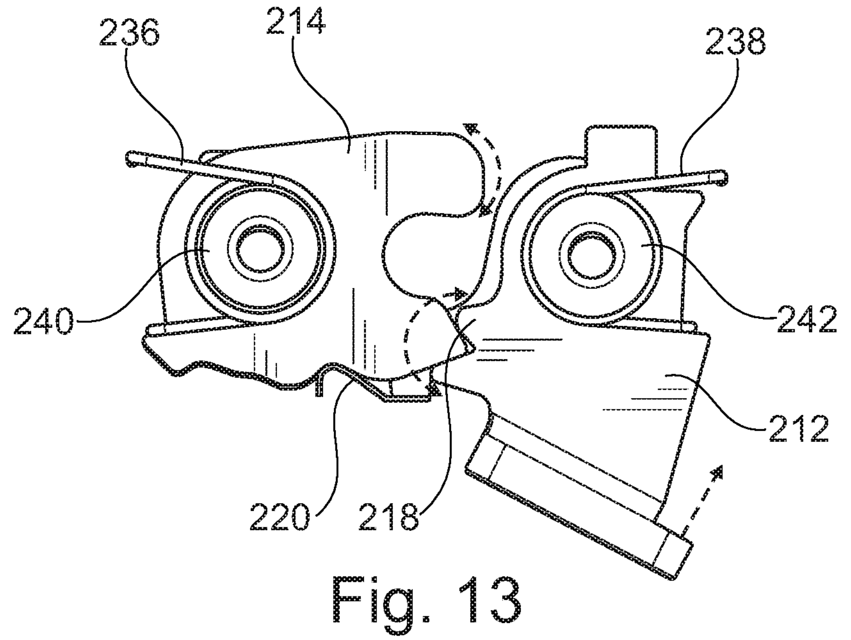
FIG. 13 is a plan view of a pawl member and trigger member of an electronic locking assembly, according to certain aspects of the present disclosure.

Referring now to FIG. 12, a plan view of electronic locking assembly 202 is shown. According to certain aspects of the present disclosure, electronic locking assembly 202 is comprised of blocker assembly 206, mounting plate 208, and electronic actuator 204. In accordance with certain embodiments, blocker assembly 206 may be comprised of a pawl member 214, a trigger member 212, and a blocker housing 234. Blocker assembly 206 may be coupled to mounting plate 208 above electronic actuator 204 such that a lower portion of a trigger member 212 is oriented adjacent to a driver member 216. In accordance with certain embodiments, electronic actuator 204 may be configured to engage driver member 216 to contact and rotate upward trigger member 212 upon receiving and authenticating a wireless access code or signal. As shown in FIG. 13, pawl member 214 and trigger member 212 may be mateably interfaced to define a locked/closed configuration of blocker assembly 206. According to certain aspects of the present disclosure, pawl member 214 may be disposed around a pawl shaft 240 and secured within blocker housing 234 by pawl retaining spring 236. Trigger member 212 may be disposed around trigger shaft 242 and secured within blocker housing 234 by trigger retaining spring 238. In accordance with certain embodiments, pawl member 214 may be mateably interfaced with a tooth portion 218 of trigger member 212. A detent spring 220 may be interfaced with a receiving portion of pawl member 214 to apply rotational force to pawl member 214 in order to bias pawl member 214 into mateably interfacing with tooth portion 218 of trigger member 212. Detent spring 220 may be further configured to apply rotational force to pawl member 214 in order to rotate pawl member 214 in an upward direction and disengage the interface between pawl member 214 and tooth portion 218 of trigger member 212 when trigger member 212 is rotated in an upwards direction upon interfacing with driver member 216 when engaged by electronic actuator 204.

Figure 14:
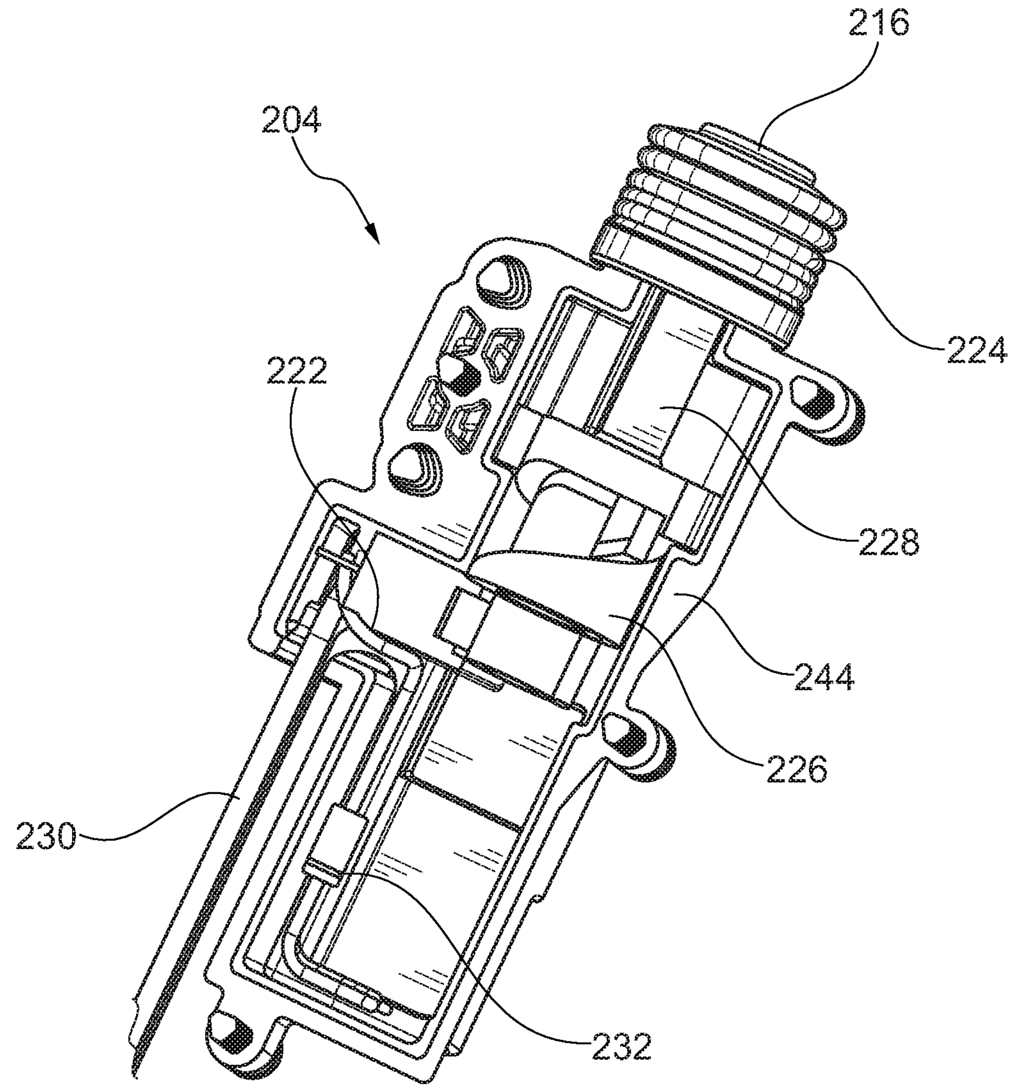
FIG. 14 is a perspective view of internal components of an electronic actuator, according to certain aspects of the present disclosure.

Referring now to FIG. 14, a perspective view of components of electronic actuator 204 is shown. According to certain aspects of the present disclosure, electronic actuator 204 is comprised of an actuator housing 244, an output cam 226, a driver cam 228, driver member 216, a bellows 224, a switch 222, a receiver 232 and a wire harness 230. In accordance with certain embodiments, wire harness 230 is operably engaged to deliver power to output cam 226 and receiver 232. Switch 222 may be operably engaged with wire harness 230 and receiver 232 to selectively close a circuit between wire harness 230 and output cam 226 to deliver power to output cam 226 upon receiving a command signal from receiver 232. Output cam 226 may comprise a motor or other electric driver configured to rotate output cam 226 upon a delivery of power from switch 222. Output cam 226 may be configured to laterally displace driver cam 228 to force driver member 216 upward (e.g. to engage with trigger member 212, as shown in FIG. 12). Switch 222 may be configured to deliver power sufficient to drive one full rotation of output cam 226 such that output cam 226 may laterally displace driver cam 228 to force driver member 216 upward and return to a starting position. Bellows 224 may be configured to seal actuator housing 244 of electronic actuator 204 to prevent debris and dirt from entering an interior portion of actuator housing 244 and may, optionally, be spring loaded to negatively bias driver member 216 to a starting position.

The present disclosure includes that contained in the appended claims as well as that of the foregoing description. Although this invention has been described in its exemplary forms with a certain degree of particularity, it is understood that the present disclosure of has been made only by way of example and numerous changes in the details of construction and combination and arrangement of parts may be employed without departing from the spirit and scope of the invention. Therefore, it will be apparent to those skilled in the art that various modifications and variations can be made to the disclosed embodiments without departing from the scope or spirit of the invention. In view of the foregoing, it is intended that the invention covers modifications and variations of this disclosure within the scope of the following claims and their equivalents.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The present disclosure includes that contained in the appended claims as well as that of the foregoing description. Although this invention has been described in its exemplary forms with a certain degree of particularity, it is understood that the present disclosure of has been made only by way of example and numerous changes in the details of construction and combination and arrangement of parts may be employed without departing from the spirit and scope of the invention.

What is claimed is:

1. A locking system comprising:

a first cover bar configured to be coupled to a first area of an outside surface of an access panel or a door panel of an enclosure;

a second cover bar configured to be coupled to a second area of the outside surface of the access panel or the door panel of the enclosure, the second cover bar comprising a cam access aperture extending through a portion of the second cover bar; and a center bar configured to extend between the first cover bar and the second cover bar;

an external cam rotatably coupled to the center bar and configured to extend through the cam access aperture of the second cover bar, wherein the external cam is configured to operably interface with a panel cam of the access panel or the door panel of the enclosure, wherein the external cam is configured to rotate the panel cam of the access panel or the door panel of the enclosure simultaneously upon rotation of the external cam.

2. The locking system of claim 1 wherein the center bar is oriented perpendicularly to the first cover bar and the second cover bar.

3. The locking system of claim 1 wherein the center bar is pivotably coupled to the first cover bar at a first end of the center bar.

4. The locking system of claim 1 wherein the first cover bar comprises an aperture configured to receive a connecting member of the center bar.

5. The locking system of claim 1 wherein the first cover bar and the second cover bar are configured to conceal one or more additional panel cams for the access panel or the door panel of the enclosure.

6. The locking system of claim 1 wherein the first cover bar and the second cover bar are oriented parallel from each other when the first cover bar is coupled to the first area of the outside surface of the access panel of the enclosure and the second cover bar is coupled to the second area of the outside surface of the access panel of the enclosure.

7. The locking system of claim 1 wherein the external cam is configured to secure the center bar to the second cover bar when the external cam is oriented in a first position and release the center bar from the second cover bar when the external cam is oriented in a second position.

8. A locking system comprising:

a first cover bar configured to be coupled to a first area of an outside surface of an access panel of an enclosure;

a second cover bar configured to be coupled to a second area of the outside surface of the access panel of the enclosure, the second cover bar comprising a cam access aperture extending through a portion of the second cover bar;

a center bar configured to extend between the first cover bar and the second cover bar;

a first cam rotatably coupled to the center bar and configured to extend through the cam access aperture of the second cover bar;

a second cam coupled to the access panel of the enclosure, wherein the first cam is operably interfaced with the second cam such that the first cam is configured to rotate the second cam simultaneously upon rotation of the first cam, wherein the first cam is configured to secure the center bar to the second cover bar when the first cam is oriented in a first position; and an electronic locking assembly configured to be coupled to an inside surface of the access panel of the enclosure, the electronic locking assembly comprising a locking mechanism configured to be selectively engaged between a locked position and an unlocked position, wherein the locking mechanism is configured to restrict rotation of the second cam when the locking mechanism is engaged in the locked position and enable rotation of the second cam when the locking mechanism is engaged in the unlocked position.

9. The locking system of claim 8 wherein the electronic locking assembly comprises a rotary latch and a trigger member, the trigger member comprising a tooth portion configured to selectively restrict rotation of the rotary latch.

10. The locking system of claim 8 wherein the electronic locking assembly further comprises an electronic actuator configured to actuate the locking mechanism between the locked position and the unlocked position.

11. The locking system of claim 10 wherein the electronic locking assembly further comprises a wireless receiver and a controller configured to receive and authenticate an access code from a mobile electronic device via a wireless communication interface.

12. The locking system of claim 11 wherein the controller is configured to command the electronic actuator to actuate the locking mechanism from the locked position to the unlocked position in response to authenticating the access code from the mobile electronic device.

13. The locking system of claim 8 wherein the second cam is configured to restrict rotation of the first cam when the locking mechanism is engaged in the locked position.

14. A locking system comprising:

a first cover bar configured to be coupled to a first area of an outside surface of an access panel of an enclosure;

a second cover bar configured to be coupled to a second area of the outside surface of the access panel of the enclosure, the second cover bar comprising a cam access aperture extending through a portion of the second cover bar;

a center bar configured to extend between the first cover bar and the second cover bar, wherein the center bar comprises an external cam configured to extend through the cam access aperture, wherein the external cam is configured to operably interface with a first cam of the access panel of the enclosure, wherein the external cam is configured to rotate the first cam of the access panel of the enclosure simultaneously upon rotation of the external cam;

a strike plate assembly coupled to a surface of the first cam of the access panel of the enclosure, the strike plate assembly comprising a strike plate and a strike pin coupled to the strike plate; and an electronic locking assembly configured to be coupled to an inside surface of the access panel of the enclosure, the electronic locking assembly comprising a locking mechanism configured to selectively secure the strike pin when configured in a locked position and selectively release the strike pin when configured in an unlocked position.

15. The locking system of claim 14 wherein the electronic locking assembly further comprises an electronic actuator configured to actuate a driver mechanism to selectively release the strike pin.

16. The locking system of claim 14 wherein the electronic locking assembly further comprises a rotary latch and a trigger member, the trigger member comprising a tooth portion configured to selectively restrict rotation of the rotary latch.

17. The locking system of claim 16 wherein the electronic locking assembly is configured to rotate the trigger member to selectively release the strike pin upon wirelessly receiving an access code signal from an electronic device.

18. The locking system of claim 14 wherein the external cam is configured to secure the center bar to the second cover bar when the external cam is oriented in a first position and release the center bar from the second cover bar when the external cam is oriented in a second position.

19. The locking system of claim 18 wherein the center bar is rotatably coupled to the first cover bar at a first end of the center bar.

20. The locking system of claim 19 wherein the first cover bar comprises an aperture configured to receive a connecting member of the center bar.

* * * * *